(12) United States Patent
Sonntag et al.

(10) Patent No.: US 10,723,846 B2
(45) Date of Patent: Jul. 28, 2020

(54) PROCESS FOR PREPARING AN ELECTRODE COMPOSITION OR COMPOSITION WITH MAGNETIC PROPERTIES, MIXTURE AND COMPOSITION OBTAINED BY MEANS OF SAID PROCESS AND SAID ELECTRODE

(71) Applicant: HUTCHINSON, Paris (FR)

(72) Inventors: Philippe Sonntag, Avon (FR); David Ayme-Perrot, Huningue (FR); Bruno Dufour, Champagne sur Seine (FR); Arnaud Prebe, Amilly (FR); Nicolas Garois, Amilly (FR)

(73) Assignee: HUTCHINSON, Paris (FR)

( * ) Notice: Subject to any disclaimer, the term of this patent is extended or adjusted under 35 U.S.C. 154(b) by 195 days.

(21) Appl. No.: 15/112,990

(22) PCT Filed: Feb. 19, 2014

(86) PCT No.: PCT/FR2014/050345
§ 371 (c)(1),
(2) Date: Jul. 20, 2016

(87) PCT Pub. No.: WO2015/124835
PCT Pub. Date: Aug. 27, 2015

(65) Prior Publication Data
US 2016/0340476 A1 Nov. 24, 2016

(51) Int. Cl.
| | |
|---|---|
| *H01M 10/054* | (2010.01) |
| *H01M 10/0525* | (2010.01) |
| *H01M 4/04* | (2006.01) |
| *H01M 4/139* | (2010.01) |
| *H01M 4/58* | (2010.01) |
| *H01M 4/62* | (2006.01) |
| *H01M 4/485* | (2010.01) |
| *C08J 3/20* | (2006.01) |
| *H01M 4/13* | (2010.01) |
| *H01G 11/50* | (2013.01) |
| *H01G 11/38* | (2013.01) |
| *H01G 11/44* | (2013.01) |
| *C08J 3/00* | (2006.01) |
| *C08J 9/00* | (2006.01) |
| *C08J 9/26* | (2006.01) |
| *C08L 69/00* | (2006.01) |
| *H01F 1/34* | (2006.01) |
| *H01M 4/02* | (2006.01) |

(52) U.S. Cl.
CPC ............... *C08J 3/201* (2013.01); *C08J 3/005* (2013.01); *C08J 9/0066* (2013.01); *C08J 9/26* (2013.01); *C08L 69/00* (2013.01); *H01F 1/344* (2013.01); *H01G 11/38* (2013.01); *H01G 11/44* (2013.01); *H01G 11/50* (2013.01); *H01M 4/0435* (2013.01); *H01M 4/0471* (2013.01); *H01M 4/13* (2013.01); *H01M 4/139* (2013.01); *H01M 4/485* (2013.01); *H01M 4/5825* (2013.01); *H01M 4/62* (2013.01); *H01M 4/622* (2013.01); *H01M 4/625* (2013.01); *H01M 10/054* (2013.01); *H01M 10/0525* (2013.01); *C08J 9/0061* (2013.01); *C08J 2201/046* (2013.01); *C08J 2369/00* (2013.01); *C08J 2415/00* (2013.01); *H01F 1/342* (2013.01); *H01M 2004/021* (2013.01); *Y02E 60/13* (2013.01)

(58) Field of Classification Search
CPC ........... H01M 10/0525; H01M 10/054; H01M 4/0435; H01M 4/0471; H01M 4/139; H01M 4/5825; H01M 4/485; H01M 4/622; H01M 4/625
See application file for complete search history.

(56) References Cited

U.S. PATENT DOCUMENTS

| | | | |
|---|---|---|---|
| 4,320,185 A * | 3/1982 | Bernstein | H01M 4/04 252/182.1 |
| 7,235,332 B2 | 6/2007 | Zushi et al. | |
| 7,820,328 B1 * | 10/2010 | Takeuchi | C08J 9/26 264/45.1 |
| 2002/0136887 A1 | 9/2002 | Penneau et al. | |
| 2006/0222952 A1* | 10/2006 | Kono | H01M 4/136 429/231.95 |
| 2006/0280921 A1 | 12/2006 | Oh et al. | |
| 2008/0226984 A1 | 9/2008 | Lee et al. | |

(Continued)

FOREIGN PATENT DOCUMENTS

| | | |
|---|---|---|
| CN | 1246877 A | 3/2000 |
| JP | 2007-297644 A | 11/2007 |

(Continued)

OTHER PUBLICATIONS

Cupta M., et al., "Photoacid generators for catalytic decomposition of polycarbonate," Journal of Applied Polymer Science, 2007, vol. 105, pp. 2655-2662.

(Continued)

*Primary Examiner* — Osei K Amponsah
(74) *Attorney, Agent, or Firm* — Arent Fox LLP

(57) ABSTRACT

A process for preparing a polymeric composition for forming a lithium-ion or sodium-ion battery electrode or a supercapacitor electrode or for exhibiting magnetic properties, to such a polymeric composition obtained by means of this process, to a mixture which is a precursor of the composition, obtained by means of a first mixing step of the process, and to this electrode.

The process for preparing this composition comprises:
  a) hot-mixing, via the melt process and without solvent, at least one active material, a binder-forming polymeric phase and a sacrificial polymeric phase so as to obtain a mixture, and
  b) at least partially eliminating said sacrificial polymeric phase so as to obtain said composition which comprises the active material(s) according to a weight fraction greater than 80%.

The sacrificial phase is used in step a) according to a weight fraction in the mixture being greater than or equal to 15%.

20 Claims, No Drawings

(56) References Cited

U.S. PATENT DOCUMENTS

| | | | | |
|---|---|---|---|---|
| 2009/0023065 A1* | 1/2009 | Hwang | ............... | H01M 4/1393 |
| | | | | 429/220 |
| 2009/0053607 A1* | 2/2009 | Jeong | ................. | H01M 4/0404 |
| | | | | 429/231.95 |
| 2011/0017939 A1 | 1/2011 | Yamaguchi | | |
| 2011/0018664 A1 | 1/2011 | Ozeki et al. | | |
| 2011/0074531 A1 | 3/2011 | Yamashita et al. | | |
| 2013/0183577 A1 | 7/2013 | Voillequin et al. | | |
| 2013/0244098 A1 | 9/2013 | Voillequin et al. | | |

FOREIGN PATENT DOCUMENTS

| | | |
|---|---|---|
| JP | 2008-248059 A | 10/2008 |
| JP | 2011-134807 A | 7/2011 |

OTHER PUBLICATIONS

International Search Report of related International Patent application No. PCT/FR2014/050345 dated Oct. 27, 2014.
JP Office Action issued in Japanese Patent Application 2016-547169 dated May 22, 2018.
Communication dated Oct. 15, 2018, from the State Intellectual Property Office of People's Republic of China in counterpart Application No. 201480073485.5.
Writ of Summons to Appear Before the Paris District Couri(Tribunal de Grande Instance de Paris), dated Feb. 6, 2019, derived from the original PCT Application No. PCT/FR2014/050345.

* cited by examiner

PROCESS FOR PREPARING AN ELECTRODE COMPOSITION OR COMPOSITION WITH MAGNETIC PROPERTIES, MIXTURE AND COMPOSITION OBTAINED BY MEANS OF SAID PROCESS AND SAID ELECTRODE

CROSS-REFERENCE TO RELATED APPLICATIONS

This application is a National Stage entry of International Application No. PCT/FR2014/050345, filed Feb. 19, 2014. The disclosure of the priority application is incorporated in its entirety herein by reference.

The present invention relates to a process for preparing a polymeric composition in particular usable for forming a lithium-ion or sodium-ion battery electrode or a supercapacitor electrode or for exhibiting magnetic properties, to such a composition obtained by means of this process, to a mixture which is a precursor of this composition, obtained by means of a first mixing step of this process, and to this lithium-ion battery electrode or supercapacitor electrode. The invention applies to all polymeric compositions comprising a very high level of filler (advantageously greater than 80% by weight or 60% by volume) and a controlled porosity according to the application chosen, the filler being, for example, an active inorganic material for a lithium-ion or sodium-ion battery electrode, porous carbon for a supercapacitor electrode or a magnetic inorganic filler.

Several processes which allow the manufacture of materials with high levels of fillers have already been described in the literature.

For example, with regard to magnetic fillers, use is generally made of a process with solvent for mixing the various compounds (e.g. magnetic filler, surface agent, compatibilizing agent, binder) in order to obtain a dispersion or slurry which, once dried, makes it possible to obtain the magnetic material, as for example described in document US-A1-2011/0018664. After coating of this dispersion, a magnetic field is applied in order to orient the magnetic fillers, the coated film obtained is dried, then it is cut into the desired shape and, finally, sintering is carried out in order to obtain the final material. For these magnetic applications, a dense material is rather sought in order to have the highest possible corresponding magnetic field.

The same type of process is found in the battery field, where the electrodes are usually obtained by means of a method with organic or aqueous solvent comprising a step of dissolving or dispersing the various compounds of the electrode including a polymeric binder in the solvent, followed by a step of spreading on a metal collector and, finally, a step of evaporating-off the solvent. This method, for example described in document U.S. Pat. No. 7,235,332 with an organic solvent, makes it possible to obtain a high porosity in the material, due to the space occupied by the solvent. This porosity is necessary for the impregnation of the electrode with an electrolyte, which makes it possible to ensure the operation thereof.

These known coating processes comprise numerous drawbacks from an environmental and safety point of view when potentially toxic or inflammable organic solvents are used. This is because it is necessary to evaporate off large amounts of these solvents. In the case of the use of aqueous solvent, the known processes by coating must include very thorough drying of the electrode, before the use thereof in a lithium-ion battery cell.

Furthermore, it is difficult to control the porosity of the material coated by evaporation of the solvent and, generally, the solvent limits the possibilities of formulation and of addition of additives to the composition, in particular owing to its migration during drying and the high molar masses which are difficult to solvate, as in the paint field.

It is therefore highly desirable to carry out a process which avoids the use of solvent and makes it possible to control the porosity of the composition obtained.

Another known process, essentially for incorporating high levels of magnetic fillers into the materials, consists in injecting into a mold a paste comprising the filler and a thermosetting resin precursor, as, for example, described in document US-A1-2006/0280921, and then baking the paste. The magnetic materials obtained have a high level of magnetic fillers linked by a three-dimensional network. Nevertheless, once crosslinked, these materials are no longer transformable and have the drawback of generally requiring long process times due to the reaction of the resins. Furthermore, this type of process is highly dependent on the flow of the thermosetting precursors through the inter-grain porosity (Darcy's law) and therefore on the viscosity of these precursors. Here also, it is not possible to use high molar masses because of excessive viscosities, nor complex formulations given the additive filtration phenomena induced by the fillers. This injection process also has a problem in terms of mold leaktightness from the moment high operating pressures are used. Finally, it is impossible with this process to control the porosity and therefore the density of the final material.

Finally, it is known practice to use continuous processes such as those generally used for thermoplastics (e.g. extrusion, mixer, injection press) allowing rapid molten processing of the materials. However, the levels of fillers achieved to date vary according to the inorganic fillers considered. Indeed, these processes which melt-mix the fillers and the dispersants in a binder generate high viscosities and abrasion of the binder by the inorganic fillers which are present in high amount. Furthermore, it is again impossible to control the density of the materials obtained. Indeed, it is possible to obtain only dense materials intrinsic to the melt process, without any control of porosity.

Regarding the incorporation of magnetic fillers, mention may be made of document US-A1-2011/017939 which describes the obtaining of materials via the melt process with an elastomeric binder where only a weight content of magnetic filler of 88% is obtained in the best of cases. In order to be able to achieve weight contents of filler greater than 90% using such a process, it is generally necessary to functionalize the filler in order to improve the compatibility thereof with the binder, via a coupling agent which modifies the surface of this filler before mixing with the binder. However, this functionalization of the filler considerably increases the overall cost and the complexity of the process. Furthermore, no control of the porosity and therefore of the density is possible with these known melt processes. Document US-A1-2011/074531 describes, for example, the obtaining, via the melt process, of materials containing a volume content of magnetic filler greater than 80%, via the functionalization of the surface of the filler with an epoxy oligomer, the use of a low-molar-mass (4 to 12 kmol/g) polymeric chain containing an amine labile hydrogen enabling crosslinking with the epoxy function, and the addition of an additive of the pentaerythritol type and of a fatty acid.

A major drawback of these processes for melt-incorporation of high contents of magnetic fillers lies in the need to functionalize the surface of the filler and to use a binder with a low molar mass, typically less than 15 kmol/g, in order to avoid the problems created by high molar masses and without compatibilization of the surface of the filler, which are in particular a considerable increase in the viscosity and therefore in the pressures associated with the process and considerable abrasion of the equipment and of the raw materials in contact, generated by the non-functionalized filler by virtue of its high concentration.

It is also known practice to carry out melt processes for preparing battery electrodes, with nevertheless major difficulties encountered in the specific case of lithium-ion batteries, due to the fact that the weight contents of active material required for a sufficient capacity of the lithium-ion battery electrode must be greater than or equal to 85%. As it happens, at such active material contents, the viscosity of the polymeric mixture becomes very high and leads to risks of overheating of the mixture and of loss of mechanical cohesion after processing thereof.

It should be recalled that lithium-ion batteries consist of at least two conductive faradic electrodes with different polarities, the anode (generally made of graphite) and the cathode (generally made of a transition metal oxide), between which electrodes is a separator consisting of an electrical insulator soaked in an aprotic electrolyte based on Li+ cations providing the ionic conductivity. The active material of a lithium-ion battery electrode enables reversible insertion/deinsertion of lithium within the electrode, and the higher the weight fraction of this active material, the greater the capacity of the electrode. The electrode must also contain an electrically conducting compound, such as carbon black, and, in order to confer sufficient mechanical cohesion on it, a polymeric binder. A lithium-ion battery is thus based on the reversible exchange of the lithium ion between the anode and the cathode during the charging and discharging of the battery, and it has a high energy density for a very low mass by virtue of the physical properties of lithium.

By way of examples of melt processes for preparing electrodes specifically of a lithium-ion battery, mention may in particular be made of the two documents US-A1-2013/0183577 and US-A1-2013/0244098, both in the name of the applicant, which respectively present cathode and anode compositions for this battery. These compositions are each characterized by the presence of a crosslinked elastomeric binder and of a non-volatile organic compound usable in the electrolyte solvent. This organic compound is present in the composition according to a low weight fraction (typically less than 5%) and may be a carbonate of at least one olefin, e.g. an ethylene carbonate.

Nevertheless, the processes presented in these latter two documents do not make it possible to control the porosity of the electrode obtained.

Document U.S. Pat. No. 7,820,328 has attempted to provide a solution to this problem by using, together with a polymeric binder and a conductive diluting filler, a low weight fraction of at most 5% of a thermally decomposed sacrificial polymer in order to obtain an electrode incorporating an active material according to a weight fraction greater than 90%, but without any implementation example detailing the process used (which can be indifferently carried out with or without solvent).

A major drawback of the process presented in the latter document lies in the difficulty in processing the electrodes in the case where they would be obtained via the melt process, and also in their electrochemical capacity which may prove to be insufficient in a lithium-ion battery.

An objective of the present invention is therefore to design a melt manufacturing process which remedies these drawbacks by in particular allowing control of the porosity of the compositions obtained according to the intended applications, with incorporation of a very high weight content of fillers typically greater than 80%, without the need for functionalization of these fillers.

This objective is achieved in that the applicant has just discovered, surprisingly, that, if an active material and additives comprising a polymeric binder and a continuous sacrificial polymeric phase are hot-mixed via the melt process and without evaporation of solvent such that the weight fraction in the obtained mixture of this phase is greater than or equal to 15%, then a polymeric composition is obtained which is usable for forming a lithium-ion or sodium-ion battery electrode or a supercapacitor electrode or for exhibiting magnetic properties, with improved plasticizing and an improved fluidity during the processing of the molten mixture despite the very high weight contents of active material(s) in the composition, and the obtaining of a controlled porosity of the composition according to the desired application, conferring thereon, as appropriate, a satisfactory electrode capacity or satisfactory magnetic field properties.

A process for preparing, according to the invention, a polymeric composition usable for forming a lithium-ion or sodium-ion battery electrode or a supercapacitor electrode or for exhibiting magnetic properties thus comprises the following steps:

a) hot-mixing, by the melt process and without solvent, at least one active material, one binder-forming polymeric phase and one sacrificial polymeric phase so as to obtain a mixture, and b) at least partially eliminating said sacrificial polymeric phase so as to obtain said composition which comprises the active material(s) according to a weight content greater than 80%, and this process according to the invention is such that said sacrificial polymeric phase is used in step a) according to a weight fraction in said mixture which is greater than or equal to 15%.

Preferably, said sacrificial polymeric phase is used in step a) according to a weight fraction in said mixture which is inclusively between 20% and 80%.

It will be noted that the process of the invention makes it possible to incorporate, directly via the melt process and using conventional plastic transformation techniques, very high cumulative filler contents into the compositions obtained, greater than 80% by weight or less than 60% by volume, which confer a high performance level on the electrochemical cells incorporating electrodes consisting of these compositions.

The applicant has thus been able to produce, by the melt process, materials that are usable as they are according to the chosen application, which, after forming and removal of the sacrificial phase, contain these very high filler contents without prior modification of the surface of the fillers nor use of a coupling agent.

It will also be noted that this process makes it possible to control the porosity within the composition through the amount of sacrificial phase introduced according to the intended application by controlling it in terms of size, of amount and of morphology of the pores, or even optionally to eliminate this porosity, using a continuous sacrificial phase which is well chosen in terms of its nature from the viewpoint of this melt process and of the application chosen. An open porosity having dimensions, for example, of less than 20 μm may be desired for applications such as electrodes which make it possible to absorb an electrolyte. According to the type of application, the porosity of the composition may be controlled (density/magnetism compromise), reduced or even eliminated by compression in order to obtain a denser material. Indeed, depending on the application chosen, it is possible either to decrease the density for an equivalent magnetic field or to increase the magnetic field for a given volume by increasing the density. In order to obtain electrodes, the material may also be compressed in order to control its porosity.

Furthermore, the mixing, the dispersion and the homogenous distribution of the binder-forming phase, of the sacrificial phase and of the active material(s) are carried out during the melt process. An optional crosslinking of the binder-forming phase is possible in order to optimize the mechanical properties and the cohesion of the composition, but is not necessary if a future transformation is envisioned.

It will also be noted that the process according to the invention provides short processing times, typical of conventional plastics technology processes such as extrusion for example, and that the improved processing ability of the compositions of the invention is subsequently maintained as long as no crosslinking has been carried out.

According to another characteristic of the invention, said sacrificial polymeric phase can be used in step a) in the form of granules of number-average size greater than 1 mm (i.e. not nanoparticles), and step a) is carried out in an internal mixer or in an extruder without macrophase separation between the binder-forming phase and the sacrificial polymeric phase in said mixture, in which the binder-forming phase is homogeneously dispersed in the sacrificial polymeric phase which is continuous, or else forms a co-continuous phase with the latter.

It will be noted that the sacrificial phase can be extracted by simple thermal decomposition or by any other process which allows its extraction without having an impact on the rest of the mixture. The sacrificial phase can also be directly extracted as soon as it leaves the die by decompression when volatile compounds are used. It is preferable to use, as sacrificial material, one or more polymer(s) which leave(s) few or no residues during its (their) decomposition. However, if such a polymer compatible with the final application is chosen as sacrificial phase, it is possible, as a variant, to control its extraction and to leave a part of the sacrificial phase in the composition obtained.

According to one embodiment of the invention, said sacrificial polymeric phase is eliminated optionally substantially without residue in step b) via a thermal decomposition, the sacrificial phase having a thermal decomposition temperature which is at least 20° C. below a thermal decomposition temperature of the binder-forming phase. In this case, this sacrificial phase is preferably based on at least one sacrificial polymer chosen from polyalkene carbonates, preferably polyethylene carbonates and/or polypropylene carbonates (other polymers known to have a clear-cut thermal degradation temperature are nevertheless also usable).

According to another embodiment of the invention, said sacrificial polymeric phase is eliminated optionally substantially without residue in step b) via an extraction with a solvent and is based on at least one liquid-extractable sacrificial polymer preferably chosen from the group consisting of polyethylene glycols, polypropylene glycols and mixtures thereof (it should be noted that other bases of liquid-extractable polymers, aqueous or organic base, are also usable).

It will be noted that, in order to be able to control the processing, the integrity of the final composition and its porosity, it is necessary to carefully choose the binder-forming polymer(s)-sacrificial polymer(s) pair and to perform the mixing while choosing with full knowledge of the facts the tools used (e.g. screw profile in the case of an extrusion), the proportions of additives, the optional compatibilizers, etc. Indeed, it is necessary, as explained above, to avoid a macrophase separation during the processing between the binder-forming phase and the sacrificial phase (pure phase of nondispersed polymer(s) greater than a few tens of μm).

It will also be noted that it is possible to use photoacid generators as additives for assisting the decomposition of the sacrificial phases, e.g. for polypropylene carbonate (reference may be made to the article by Cupta M., Jayachandran P., Khol P., Photoacid generators for catalytic decomposition of polycarbonate, Journal of Applied Polymer Science, 2007, Vol. 105, pp. 2655-2662). The use of these photoacids makes it possible to reduce the degradation temperatures after processing of the cathode in particular. They are therefore useful without being necessary for the invention.

By way of active material(s) usable in the process of the invention and present in the composition obtained in step b) according to a weight fraction preferably greater than or equal to 85%, use may be made, depending on the desired application, of a filler chosen from the group consisting of:

all magnetic inorganic fillers known to those skilled in the art, such as ferrites $Fe_2O_3$ and magnetic materials of the Nd—Fe—B or Sm—Fe—N type or based on cobalt, such as SmCo, in particular, active inorganic fillers capable of allowing lithium insertion/deinsertion for lithium-ion battery electrodes, comprising lithiated polyanionic compounds or complexes, such as a lithiated metal M phosphate of formula $LiMPO_4$, coated with carbon (e.g. C—$LiFePO_4$), a lithiated titanium oxide of formula $Li_4Ti_5O_{12}$, or any other active material known to those skilled in the art for cathodes (e.g. $LiCoO_2$, $LiMnO_4$ or $LiNi_{1/3}Mn_{1/3}Co_{1/3}O_4$) or anodes (e.g. graphite), and fillers comprising porous carbon for supercapacitor electrodes.

Electroconductive inorganic fillers can be added together with others, for example in the context of electrodes for lithium-ion or sodium-ion batteries or for supercapacitors, but also alone in the context of highly conductive applications, for conductivities greater than one S/cm. Mention may be made, for example, of conductive carbon black, but also graphite, graphene, carbon nanofibers, carbon nanotubes and a mixture thereof.

By way of binder-forming polymer(s) providing the cohesion of the composition after processing, use may be made of any of the polymer bases, subject to their ability to be melt-processed and, as previously mentioned, to their possible compatibilization with the selected sacrificial phase. Mention may for example be made of polyolefins, halogenated polymers, acrylic polymers, acrylates, methacrylates, vinyl acetates, polyethers, polyesters, polyamides, aromatic polymers and elastomers.

Preferably, said binder-forming phase comprises at least one crosslinked or noncrosslinked elastomer, which is used in said mixture according to a weight fraction of between 1% and 12% and which is preferably chosen from the group consisting of hydrogenated butadiene/acrylonitrile copolymers (HNBR), ethylene/acrylate copolymers, polyisoprenes and mixtures thereof. As a variant, other elastomers of thermoplastic elastomer or rubber type are usable. It is, however, preferable to use a binder which provides continuity of the elastic properties over a temperature range of approximately from −20° C. to 80° C., whence the preferential use of elastomers such as HNBR or ethylene/acrylate copolymers, in particular.

It is possible to add specific additives to the compositions of the invention in order to improve or optimize the process for the manufacture thereof. It is also possible to add compounds which allow crosslinking of the binder and also coagents capable of assisting the crosslinking and the homogenization thereof. Mention may, for example, be made of organic peroxides as crosslinking agent and triallyl cyanurate as coagent. Use may also be made of any compounds which allow crosslinking of the binder, such as photoinitiators or sulfur-containing compounds (typical of the crosslinking of rubbers by vulcanization). As a variant, use may be made of chemical reactions of bifunctional compounds on the pendant chains of the binder, such as maleic anhydride, epoxide, acid, alcohol, amine, amide or ester functions, provided that a reaction on the pendant functions leads to the formation of bridges between chains of the polymer and, consequently, crosslinking of the binder. The crosslinking makes it possible to ensure cohesion of the composition according to the nature of the binder. As indicated above, it will be noted that the use of a crosslinking agent and coagent is useful but not necessary for the invention, and depends directly on the intended application and on the need to preserve an ability to be processed for the composition (in the case where it is not crosslinked) or not to conserve it (in the case of a crosslinked composition).

Advantageously, said composition obtained in step b) can have a volume porosity of between 30% and 70% and is suitable for forming a lithium-ion or sodium-ion battery electrode or a supercapacitor electrode.

According to another characteristic of the invention, the process may comprise, between steps a) and b), a step of fashioning by calendering said mixture obtained in step a), and said composition obtained in step b) is formed from a sheet having a thickness of between 50 μm and 150 μm.

According to another aspect of the invention regarding the case where the elimination of said sacrificial polymeric phase is only partial, a polymeric composition according to the invention which is usable for forming a lithium-ion or sodium-ion battery electrode or a supercapacitor electrode or for exhibiting magnetic properties is such that the composition is obtained by means of said process of the invention as defined above and may exhibit said sacrificial phase according to a weight fraction greater than or equal to 0.001% and for example of between 0.01% and 10%.

According to yet another aspect of the invention, a polymeric mixture according to the invention which is usable for forming a precursor of this composition (e.g. an electrode precursor) is such that this mixture is obtained by step a) of said process of the invention and comprises said sacrificial polymeric phase according to a weight fraction in this mixture greater than or equal to 15% and preferably inclusively of between 20% and 80%.

As indicated above, this mixture of the invention is also such that said binder-forming phase is homogeneously dispersed in said sacrificial polymeric phase which is continuous, or else forms a co-continuous phase with the latter.

A lithium-ion or sodium-ion battery electrode or a supercapacitor electrode according to the invention (e.g. a cathode or an anode) is such that it comprises a polymeric composition according to the invention as defined above.

Advantageously, this electrode may be such that said composition also comprises an electrically conducting filler chosen from the group consisting of carbon black, graphite, expanded graphite, carbon fibers, carbon nanotubes, graphene and mixtures thereof, said electrically conducting filler being present in the composition according to a weight fraction of between 1% and 10%.

It should be noted that the invention set out in the present description can be applied to fields other than those mentioned above which require higher contents of inorganic (metallic, magnetic, or the like) fillers and optionally a control of the porosity of the composition obtained, for instance for insulating screens between two diamagnetics. It is also possible, by replacing the magnetic fillers with electroconductive fillers, to use, via the melt process, materials having very high electrical conductivities (greater than one S/cm) which are optionally porous depending on the desired application. A controlled and finely dispersed porosity allows thermal or sound insulation, while at the same time having a high filler content. It is thus possible, for example, to advantageously obtain effects of high electrical conductivities combined with thermal insulation in the context of the Seebeck or Peltier effect and of a thermoelectric generator.

Other characteristics, advantages and details of the present invention will emerge from reading the following description of several implementation examples of the invention, given by way of nonlimiting illustration, in comparison with a "control" example not in accordance with the invention.

In the case of the use of inorganic fillers for energy storage applications, the compositions obtained have been characterized electrochemically. For this, disks 14 mm in diameter were cut out using a hole punch and were placed in a glovebox under an inert atmosphere. Button cells with lithium metal as counterelectrode were assembled in the glovebox in order to prepare half-cells. The electrolyte used (supplied by the company Solvionic) was the following: $LiPF_6$ at 1M in EC/DMC at 1 v/1 v. The cells thus assembled were characterized on a "Biologic VMP3" galvanostatic bench at various charge and discharge rates. The measurements were essentially carried out at C/5.

EXAMPLE 1

According to the Invention

A composition 1 of magnetic material was prepared according to the following formulations (expressed as weight and volume fractions), for the mixture before extraction of the sacrificial polymer and for composition 1 obtained after this extraction.

TABLE 1

| Composition 1 | Before extraction | | After extraction | |
|---|---|---|---|---|
| | % by weight | % by volume | % by weight | % by volume |
| Binder: HNBR (Zetpol 2010L) | 4 | 12.5 | 5 | 22 |
| Active material: Ferrites (NK-132) | 76 | 44.3 | 95 | 78 |
| Sacrificial polymer: Polyethylene carbonate (QPAC25) | 20 | 43.2 | 0 | 0 |

Composition 1 was prepared using an internal mixer at 60° C. The HNBR and a part of the polyethylene carbonate were first added in order to obtain a plasticized molten mixture. The magnetic fillers were then gradually added with regular addition of the remaining polyethylene carbonate, until a homogeneous mixture was obtained.

The mixture obtained was then calendered in the form of a sheet before placing it in an oven at 230° C. under air for 15 min. Finally, the resulting product was placed in a press at 150° C. in order to re-densify the material forming this composition 1.

During the heat treatment, the elimination of the polyethylene carbonate was measured by difference in weight: 100% of the polyethylene carbonate initially incorporated into the mixture was thus decomposed. This results in a decrease in density of composition 1 from 3 g/cm$^3$ to 2.4 g/cm$^3$. After redensification, a density of 3.7 g/cm$^3$ was obtained.

Contrary to the prior art set out in the preamble, it will be noted that this process for preparing composition 1 does not require the surface functionalization of the magnetic fillers, which can be used as they are for the magnetic fields that they generate in the final product by virtue of the high amounts of fillers (weight content of 95%) and of the redensification of the material after extraction of the sacrificial polymer.

It will also be noted that this process makes it possible to obtain a strong magnetic field in one direction, by virtue of the presence of a relatively high content of sacrificial phase in the molten mixture (weight content of 20%) and of the fluidity of the mixture. Once the fillers have been added and oriented, this extraction and redensification make it possible to preserve this orientation and to increase the density and therefore the intensity of the field emitted.

EXAMPLE 2

According to the Invention

A cathode composition 2 for a lithium-ion battery was prepared according to the following formulations, for the mixture before extraction of the sacrificial polymer and for composition 2 obtained after the extraction.

TABLE 2

| Composition 2 | Before extraction | | After extraction | |
|---|---|---|---|---|
| | % by weight | % by volume | % by weight | % by volume |
| Binder: HNBR (Zetpol 2010L) | 4.9 | 10.4 | 7.5 | 20.8 |
| Conductive filler: Carbon black (C-Nergy C65) | 4.9 | 5.3 | 7.5 | 10.6 |
| Sacrificial polymer: Polyethylene carbonate (QPAC25) | 34.2 | 50 | 0 | 0 |
| Active material: C—LiFePO$_4$ ("Life power P2") | 56 | 34.3 | 85 | 68.6 |

Composition 2 was prepared using an internal mixer at 70° C. The HNBR and a part of the polyethylene carbonate were first added in order to obtain a plasticized molten mixture. The inorganic fillers were then gradually added with regular addition of the remaining polyethylene carbonate, until a homogeneous mixture was obtained.

The mixture obtained was then calendered in the form of a sheet in order to compress it under a press at 170° C. for 15 min. Finally, a step of decomposition of the sacrificial polymer in an oven under air at 230° C. for 15 min was carried out. During the heat treatment, the elimination of the polyethylene carbonate was measured by difference in weight: 100% of the polyethylene carbonate initially incorporated into the mixture was thus decomposed. This resulted in a decrease in density of the electrode from 2.0 g/cm$^3$ to 1.3 g/cm$^3$ and in a volume porosity of 50%.

It will be noted that the resulting composition 2, which stems from a molten mixture comprising more than 30% by weight of sacrificial phase and which comprises 85% by weight of active material, may be directly usable as a cathode. Indeed, this composition 2 was characterized in a button cell against Li metal. By fixing a current equivalent to a charge and discharge rate of C/5, a maximum discharge capacity achieved of 115 mAh per gram of cathode was obtained (without including the weight of the current collector), which corresponds to a capacity of 135 mAh per gram of C—LiFePO$_4$.

EXAMPLE 3

According to the Invention

A cathode composition 3 for a lithium-ion battery was prepared according to the following formulations (expressed in weight and volume fractions), for the mixture before extraction of the sacrificial polymer and for composition 3 obtained after this extraction.

TABLE 3

| Composition 3 | Before extraction | | After extraction | |
|---|---|---|---|---|
| | % by weight | % by volume | % by weight | % by volume |
| Binder: HNBR (Zetpol 2010L) | 5.7 | 12.5 | 7.5 | 20.8 |
| Conductive filler: Carbon black (C-Nergy C65) | 5.7 | 6.4 | 7.5 | 10.6 |
| Sacrificial polymer: Polypropylene carbonate (low molar mass) | 11.9 | 20 | 0 | 0 |
| Sacrificial polymer: Polypropylene carbonate (high molar mass) | 11.9 | 20 | 0 | 0 |
| Active material: C—LiFePO$_4$ ("Life power P2") | 64.8 | 41.1 | 85 | 68.6 |

Composition 3 was prepared using an internal mixer at 80° C. The HNBR and the high-molar-mass polypropylene carbonate were first added in order to obtain a plasticized molten mixture. The inorganic fillers were then gradually added with regular addition of the low-molar-mass polypropylene carbonate (preheating of the material to approximately 60° C. may be necessary in order to reduce the viscosity thereof and to facilitate the addition), until a homogeneous mixture was obtained.

The mixture obtained was then calendered in the form of a sheet in order to compress it under a press at 170° C. for 15 min. Finally, a step of decomposition of the sacrificial polymer in an oven under air at 230° C. for 45 min was carried out. During the heat treatment, the elimination of the polypropylene carbonates was measured by difference in weight: 100% of the polypropylene carbonates initially incorporated into the mixture was thus decomposed. This resulted in a decrease in density of the electrode from 2.1 g/cm$^3$ to 1.6 g/cm$^3$ and in a volume porosity of 40%.

It will be noted that the resulting composition 3, which stems from a molten mixture comprising more than 20% by weight of sacrificial phase and which comprises 85% by weight of active material, may be directly usable as a cathode. Indeed, it was characterized in a button cell against Li metal. By fixing a current equivalent to a charge and discharge rate of C/5, a maximum discharge capacity achieved of 123 mAh per gram of cathode was obtained (without including the weight of the current collector), which corresponds to a capacity of 145 mAh per gram of C—LiFePO$_4$.

EXAMPLE 4

According to the Invention

A cathode composition 4 for a lithium-ion battery was prepared according to the following formulations (expressed as weight and volume fractions), for the mixture before extraction of the sacrificial polymer and for composition 4 obtained after this extraction.

TABLE 4

| Composition 4 | Before extraction | | After extraction | |
|---|---|---|---|---|
| | % by weight | % by volume | % by weight | % by volume |
| Binder: Ethylene-ethyl acrylate (Lotader 5500) | 3.4 | 7.6 | 5 | 15.3 |
| Conductive filler: Carbon black (C-Nergy C65) | 3.4 | 3.7 | 5 | 7.5 |
| Sacrificial polymer: Polypropylene carbonate (QPAC40) | 30.9 | 50.4 | 0 | 0 |
| Active material: C—LiFePO$_4$ ("Life power P2") | 62.3 | 38.3 | 90 | 77.2 |

Composition 4 was prepared using a twin-screw extruder equipped with three gravimetric metering devices, with a side feeder, with a gear pump and with a flat die. The various starting materials were distributed in these various gravimetric metering devices. During the extrusion, the flow rates of the metering devices were regulated so as to obtain the desired composition 4. The starting materials were dispersed and homogenized by the melt process in the twin-screw extruder using a specific screw profile. The gear pump and the flat die at the end of the extruder served to form the mixture obtained in the form of a film directly deposited on a current collector. The film thus obtained was subsequently heat treated at 230° C. for 60 min, under air, in order to obtain the final composition 4.

During the heat treatment, the elimination of the polypropylene carbonate was measured by difference in weight: 100% of the polypropylene carbonate incorporated into the mixture was thus decomposed. This resulted in a decrease in density of the electrode from 2.0 g/cm$^3$ to 1.4 g/cm$^3$ and in a volume porosity of 50%.

The resulting composition 4, which stems from a molten mixture comprising more than 30% by weight of sacrificial phase and which comprises 90% by weight of active material, may be directly usable as a cathode. Indeed, it was characterized in a button cell against Li metal. By fixing a current equivalent to a charge and discharge rate of C/5, a maximum discharge capacity attained of 123 mAh per gram of cathode was obtained (without including the weight of the collector), which corresponds to a capacity of 136 mAh per gram of C—LiFePO$_4$.

EXAMPLE 5

According to the Invention

A cathode composition 5 for a lithium-ion battery was prepared according to the following formulations (expressed as weight and volume fractions), for the mixture before extraction of the sacrificial polymer and for composition 5 obtained after this extraction.

TABLE 5

| Composition 5 | Before extraction | | After extraction | |
|---|---|---|---|---|
| | % by weight | % by volume | % by weight | % by volume |
| Binder: Ethylene-ethyl acrylate (Lotader 5500) | 3.4 | 7.7 | 5 | 15.8 |
| Conductive filler: Carbon black (C-Nergy C65) | 3.4 | 3.8 | 5 | 7.7 |
| Sacrificial polymer: Polypropylene carbonate (QPAC40) | 30.9 | 51.2 | 0 | 0 |
| Active material: Li$_4$Ti$_5$O$_{12}$ (EXM 1979) | 62.3 | 37.3 | 90 | 76.5 |

Composition 5 was prepared using a twin-screw extruder equipped with three gravimetric metering devices, with a side feed, with a gear pump and with a flat die. The various starting materials were distributed into these various gravimetric measuring devices. During the extrusion, the flow rates of the measuring devices were regulated so as to obtain the desired composition 5. The starting materials were dispersed and homogenized by the melt process in the twin-screw extruder using a specific screw profile. The gear pump and the flat die at the end of the extruder served to form the mixture obtained in the form of a film directly deposited on a current collector. The film thus obtained was then heat treated at 230° C. for 60 min, under air, in order to obtain the final composition 5.

During the heat treatment, the elimination of the polypropylene carbonate was measured by difference in weight. 100% of the polypropylene carbonate incorporated into the mixture was thus decomposed. This resulted in a decrease in density of the electrode from 2.1 g/cm$^3$ to 1.4 g/cm$^3$ and in a volume porosity of 50%.

The resulting composition 5, which stems from a molten mixture comprising more than 30% by weight of sacrificial phase and which comprises 90% by weight of active material, may be directly usable as a cathode. Indeed, it was characterized in a button cell against Li metal. By fixing a current equivalent to a charge and discharge rate of C/5, a maximum discharge capacity attained of 135 mAh per gram of cathode was obtained (without including the weight of the collector), which corresponds to a capacity of 150 mAh per gram of Li$_4$Ti$_5$O$_{12}$.

EXAMPLE 6

According to the Invention

A cathode composition 6 for a lithium-ion battery was prepared according to the following formulations (expressed as weight and volume fractions), for the mixture before extraction of the sacrificial polymer and for composition 6 obtained after this extraction.

TABLE 6

| Composition 6 | Before extraction | | After extraction | |
|---|---|---|---|---|
| | % by weight | % by volume | % by weight | % by volume |
| Binder: HNBR (Zetpol 2010L) | 3.75 | 7.1 | 7.5 | 20.8 |
| Conductive filler: Carbon black (C-Nergy C65) | 3.75 | 3.6 | 7.5 | 10.6 |
| Sacrificial polymer: Polyethylene carbonate (QPAC25) | 50 | 65.8 | 0 | 0 |

TABLE 6-continued

| Composition 6 | Before extraction | | After extraction | |
|---|---|---|---|---|
| | % by weight | % by volume | % by weight | % by volume |
| Active material: C—LiFePO$_4$ ("Life power P2") | 42.5 | 23.5 | 85 | 68.6 |

Composition 6 was prepared using an internal mixer at 70° C. The HNBR and a part of the polyethylene carbonate were first added in order to obtain a plasticized molten mixture. The inorganic fillers were then gradually added with regular addition of the remaining polyethylene carbonate, until a homogeneous mixture was obtained.

The mixture obtained was then calendered in the form of a sheet in order to compress it under a press at 170° C. for 15 min. Finally, a step of decomposition of the sacrificial polymer in an oven under air at 240° C. for 30 min was carried out. During the heat treatment, the elimination of the polyethylene carbonate was measured by difference in weight: 100% of the polyethylene carbonate initially incorporated into the mixture was thus decomposed. This resulted in a volume porosity of 66%.

The resulting composition 6, which stems from a molten mixture comprising 50% by weight of sacrificial phase and which comprises 85% by weight of active material, may be directly usable as a cathode. Indeed, it was characterized in a button cell against Li metal. By fixing a current equivalent to a charge and discharge rate of C/5, a maximum discharge capacity attained of 109 mAh per gram of cathode was obtained (without including the weight of the current collector), which corresponds to a capacity of 128 mAh per gram of C—LiFePO$_4$.

This electrode was, moreover, compressed after degradation of the sacrificial phase, the resulting product still having the same final formulation as composition 6 and likewise being directly usable as a cathode. It was characterized as previously in a button cell against Li metal, with a current equivalent to a charge and discharge rate of C/5 being fixed, and a maximum discharge capacity attained of 106 mAh per gram of cathode was obtained (without including the weight of the collector), which corresponds to a capacity of 124 mAh per gram of C—LiFePO$_4$.

It will be noted that the very high (50%) weight content of sacrificial phase used in the molten mixture advantageously makes it possible to render this mixture very fluid and to achieve very low electrode thicknesses (50 μm).

It will also be noted that the final compression makes it possible to reduce the very high porosity (66%) of composition 6, in order to have an energy density which is acceptable for the electrode.

"Control" Example not in Accordance with the Invention

A "control" cathode composition for a lithium-ion battery was prepared according to the following formulations (expressed as weight and volume fractions), for the mixture before extraction of the sacrificial polymer and for the "control" composition obtained after this extraction.

TABLE 7

| "Control" composition | Before extraction | | After extraction | |
|---|---|---|---|---|
| | % by weight | % by volume | % by weight | % by volume |
| Binder: HNBR (Zetpol 2010L) | 6.75 | 17.1 | 7.5 | 20.8 |
| Conductive filler: Carbon black (C-Nergy C65) | 6.75 | 8.8 | 7.5 | 10.6 |
| Sacrificial polymer: Polyethylene carbonate (QPAC25) | 10 | 17.6 | 0 | 0 |
| Active material: C—LiFePO$_4$ ("Life power P2") | 76.5 | 56.5 | 85 | 68.6 |

The "control" composition was prepared using an internal mixer at 70° C. The HNBR and the polyethylene carbonate were first added in order to obtain a plasticized molten mixture. A part of the inorganic fillers was then gradually added. The remainder of the inorganic fillers had to be added on an open mixer. This is because complete addition of the fillers in the internal mixer leads to a phenomenon of scorching due to abrasion.

The mixture obtained was then calendered in the form of a sheet in order to compress it under a press at 170° C. for 15 min. Because of the high viscosity of the mixture, it was only possible to obtain a thickness of 280 μm, in comparison with the 50 μm to 150 μm obtained under normal circumstances with the process of the invention.

Finally, a step of decomposition of the sacrificial polymer in an oven under air at 230° C. for 20 min was carried out. During the heat treatment, the elimination of the polyethylene carbonate was measured by difference in weight: 100% of the polyethylene carbonate initially incorporated into the mixture was thus decomposed. This resulted in a volume porosity of only 17.6%.

The "control" composition obtained was characterized in a button cell against Li metal. By fixing a current equivalent to a charge and discharge rate of C/5, a maximum discharge capacity attained of 26 mAh per gram of cathode was obtained (without including the weight of the current collector), which corresponds to a capacity of 30 mAh per gram of C—LiFePO$_4$.

It will be noted that this "control" composition, which stems from a molten mixture containing only 10% by weight of sacrificial phase, contrary to the amounts of at least 15% required in the molten mixtures of the present invention, is very difficult to use.

Furthermore, this very sparingly porous "control" composition (porosity of less than 20% by volume) does not provide effective electrochemical results because of the insufficient access of the electrolyte to the active material which results therefrom (see the maximum discharge capacity of only 26 mAh per gram of cathode), in particular contrary to example 2 according to the invention characterized by the same final weight content of active material (85%), but also by the incorporation of a much higher weight content of sacrificial phase (more than 30%) which provides a maximum discharge capacity of 115 mAh per gram of cathode.

The invention claimed is:

1. A process for preparing a polymeric composition, the process comprising:
   a) hot-mixing, by a melt process and without solvent, at least one active material, a binder-forming polymeric phase and a sacrificial polymeric phase to obtain a molten mixture, and b) at least partially eliminating said sacrificial polymeric phase to obtain said polymeric composition which comprises the at least one active material according to a weight fraction greater than 80%, wherein said sacrificial polymeric phase is used in step a) according to a weight fraction in said mixture which is greater than or equal to 15%, wherein said binder-forming polymeric phase comprises at least one noncrosslinked elastomer chosen from a group consisting of hydrogenated butadiene/acrylonitrile copolymers (HNBR), ethylene/acrylate/maleic anhydride terpolymers, and mixtures thereof, said polymeric composition being devoid of a crosslinking agent, wherein said sacrificial polymeric phase is eliminated in step b) via a thermal decomposition, and wherein the polymeric composition forms a lithium-ion or sodium-ion battery electrode or a supercapacitor electrode, or exhibits magnetic properties.

2. The process as claimed in claim 1, wherein said sacrificial polymeric phase is used in step a) according to a weight fraction in said mixture which is inclusively between 20% and 80%.

3. The process as claimed in claim 1, wherein said sacrificial polymeric phase is used in step a) in the form of granules having a number-average size greater than 1 mm, and wherein step a) is carried out in an internal mixer or in an extruder without macrophase separation between said binder-forming polymeric phase and said sacrificial polymeric phase in said mixture, in which said binder-forming phase is homogeneously dispersed in said sacrificial polymeric phase which is continuous, or else forms a co-continuous phase with the latter.

4. The process as claimed in claim 1, wherein said sacrificial polymeric phase has a thermal decomposition temperature which is at least 20° C. below a thermal decomposition temperature of said binder-forming phase.

5. The process as claimed in claim 4, wherein said sacrificial polymeric phase is based on at least one sacrificial polymer chosen from polyalkene carbonates, preferably polyethylene carbonates and/or polypropylene carbonates.

6. The process as claimed in claim 1, wherein said at least one elastomer is used in said mixture according to a weight fraction of between 1% and 12%.

7. The process as claimed in claim 1, wherein said active material(s) is (are) present in said polymeric composition obtained in step b) according to a weight fraction preferably greater than or equal to 85%, and is (are) chosen from the group consisting of:
 magnetic inorganic fillers, such as ferrites,
 active inorganic fillers capable of allowing lithium insertion/deinsertion for lithium-ion battery electrodes, comprising lithiated polyanionic compounds or complexes such as a lithiated metal M phosphate of formula $LiMPO_4$ coated with carbon, a lithiated titanium oxide of formula $Li_4Ti_5O_{12}$, oxides of formula $LiCoO_2$, $LiMnO_4$ or $LiNi_{1/3}Mn_{1/3}Co_{1/3}O_4$, or graphite, and
 fillers comprising porous carbon for supercapacitor electrodes.

8. The process as claimed in claim 1, wherein said polymeric composition obtained in step b) has a volume porosity between 30% and 70% and is suitable for forming a lithium-ion or sodium-ion battery electrode or a supercapacitor electrode.

9. The process as claimed in claim 1, wherein the process comprises, between steps a) and b), a step of fashioning by calendering said mixture obtained in step a), and wherein said polymeric composition obtained in step b) is formed from a sheet having a thickness of between 50 μm and 150 μm.

10. A polymeric composition forming a lithium-ion or sodium-ion battery electrode or a supercapacitor electrode or exhibiting magnetic properties, wherein said polymeric composition is made by the process of claim 1, the polymeric composition comprises:
 at least one active material according to a weight fraction greater than 80%;
 a binder-forming polymeric phase; and
 a sacrificial polymeric phase according to a weight fraction greater than or equal to 0.001%,
wherein said polymeric composition derives from a molten mixture of said at least one active material, said binder-forming polymeric phase and said sacrificial polymeric phase, in which said sacrificial polymeric phase has been partially eliminated,
wherein said polymeric composition is devoid of a solvent in which said at least one active material, said binder-forming polymeric phase and said sacrificial polymeric phase are dissolved or dispersed, and
wherein said binder-forming polymeric phase comprises at least one noncrosslinked elastomer chosen from a group consisting of hydrogenated butadiene/acrylonitrile copolymers (HNBR), ethylene/acrylate/maleic anhydride terpolymers, and mixtures thereof, said polymeric composition being devoid of a crosslinking agent.

11. A polymeric molten mixture usable for forming a precursor of said polymeric composition as claimed in claim 10, wherein said polymeric molten mixture is obtained by hot-mixing, by a melt process and without solvent, said at least one active material, said binder-forming polymeric phase and said sacrificial polymeric phase, and wherein said polymeric molten mixture comprises said sacrificial polymeric phase according to a weight fraction in said mixture greater than or equal to 15% and preferably inclusively of between 20% and 80%.

12. The polymeric molten mixture as claimed in claim 11, wherein said binder-forming polymeric phase is homogeneously dispersed in said sacrificial polymeric phase which is continuous, or else forms a co-continuous phase with the latter.

13. A lithium-ion or sodium-ion battery electrode or supercapacitor electrode, wherein it comprises the polymeric composition as claimed in claim 10.

14. The electrode as claimed in claim 13, wherein said polymeric composition also comprises an electrically conducting filler chosen from the group consisting of carbon black, graphite, expanded graphite, carbon fibers, carbon nanotubes, graphene and mixtures thereof, said electrically conducting filler being present in said polymeric composition according to a weight fraction of between 1% and 10%.

15. The process as claimed in claim 1, wherein said at least one noncrosslinked elastomer is chosen from the group consisting of hydrogenated butadiene/acrylonitrile copolymers (HNBR), ethylene-ethyl acrylate-maleic anhydride terpolymers, and mixtures thereof.

16. The process as claimed in claim 1, wherein said binder-forming polymeric phase consists of said at least one noncrosslinked elastomer.

17. The polymeric composition as claimed in claim 10, wherein said at least one noncrosslinked elastomer is chosen from the group consisting of hydrogenated butadiene/acrylonitrile copolymers (HNBR), ethylene-ethyl acrylate-maleic anhydride terpolymers and mixtures thereof.

18. The polymeric composition as claimed in claim 10, wherein said binder-forming polymeric phase consists of said at least one noncrosslinked elastomer.

19. The process as claimed in claim 7, wherein said at least one active material is a magnetic inorganic filler chosen from the group consisting of ferrites, said polymeric composition exhibiting magnetic properties.

20. The process as claimed in claim 7, wherein said at least one active material is an active inorganic filler capable of allowing lithium insertion/deinsertion for lithium-ion battery electrodes, comprising lithiated polyanionic compounds or complexes such as a lithiated metal M phosphate of formula $LiMPO_4$ coated with carbon, a lithiated titanium oxide of formula $Li_4Ti_5O_{12}$, oxides of formula $LiCoO_2$, $LiMnO_4$ or $LiNi_{1/3}Mn_{1/3}Co_{1/3}O_4$, said polymeric composition forming a lithium-ion battery electrode.

* * * * *